United States Patent [19]
Kameyama

[11] Patent Number: 5,917,152
[45] Date of Patent: Jun. 29, 1999

[54] DOOR WIRING HARNESS CONNECTING STRUCTURE

[75] Inventor: Isao Kameyama, Shizuoka, Japan

[73] Assignee: Yazaki Corporation, Tokyo, Japan

[21] Appl. No.: 08/992,694

[22] Filed: Dec. 17, 1997

[30] Foreign Application Priority Data

Dec. 19, 1996 [JP] Japan ..................................... 8-339502

[51] Int. Cl.⁶ ................................................... H02G 3/00
[52] U.S. Cl. ........................ 174/72 A; 174/72 C; 361/826
[58] Field of Search .............................. 174/70 R, 71 R, 174/72 R, 72 A, 72 C, DIG. 9, 727 R; 280/290; 361/826; 439/34; 307/147, 149; 29/857

[56] References Cited

U.S. PATENT DOCUMENTS

| | | | |
|---|---|---|---|
| 4,800,648 | 1/1989 | Nakayama et al. | 29/854 |
| 4,869,670 | 9/1989 | Ueda et al. | 439/34 |
| 4,907,836 | 3/1990 | Ueda et al. | 296/39.1 |
| 4,942,499 | 7/1990 | Shibata et al. | 361/826 |
| 5,324,203 | 6/1994 | Sano et al. | 439/34 |
| 5,442,518 | 8/1995 | Beam | 361/690 |
| 5,460,530 | 10/1995 | Toba et al. | 439/34 |
| 5,676,552 | 10/1997 | Fukuda et al. | 439/34 |
| 5,735,041 | 4/1998 | Zaguskin et al. | 29/857 |
| 5,743,010 | 4/1998 | Zaguskin et al. | 29/857 |
| 5,777,267 | 7/1998 | Szydel | 174/72 A |

FOREIGN PATENT DOCUMENTS

| | | | |
|---|---|---|---|
| 0534659 | 3/1993 | European Pat. Off. | 174/72 A |
| 61-73511 | 4/1986 | Japan . | |
| 2164609 | 3/1986 | United Kingdom | 174/72 A |

*Primary Examiner*—Kristine Kincaid
*Assistant Examiner*—Dhiru R. Patel
*Attorney, Agent, or Firm*—Armstrong, Westerman, Hattori, McLeleland & Naughton

[57] ABSTRACT

A door wiring harness connecting structure for easily and surely connecting wiring harnesses of a doorframe and of a trim cover is disclosed. A receiving member is provided on the doorframe and a holdings member relative to the receiving member is provided on the trim cover, and a terminal-accommodating portion which accommodates a terminal portion of a flexible flat wiring harness installed on the doorframe is formed on the receiving member, and a contacting spring-portion of the terminal portion projects into a receiving groove on the doorframe, and an end connecting-portion of another flexible flat wiring harness installed on the trim cover is fixed to an inside of the hooking member. The terminal portion has projections on both sides, and the terminal-accommodating portion has a terminal-inserting groove and an exposing opening relative to the projections and to the contacting spring-portion, respectively. The hooking member is provided with locking pins relative to locking holes on the harness on the trim cover. Thus, easy and sure connection of the wiring harnesses can be realized.

9 Claims, 6 Drawing Sheets

DOOR WIRING HARNESS CONNECTING STRUCTURE

BACKGROUND OF THE INVENTION

1. Field of the Invention

The present invention relates to a door wiring harness connecting structure for connecting wiring harnesses of a doorframe and of a trim cover upon installing the trim cover to the doorframe.

2. Description of the Prior Art

Fig.7 shows a prior art door wiring harness connecting structure disclosed in Japanese Patent Application Publication No. 61-73511.

In this structure, a wiring harness 43 on a vehicle door (i.e. a door wiring harness) is connected to electric accessories 44,45,46 upon installing a trim cover 42 to a doorframe 41.

A cowl-side wiring harness 47 on a vehicle body side is connected to the doorframe 41, and electric accessories such as power-window motor 44 and door-lock unit 45 with respective connectors 48,49 are arranged on the frame 41.

A harness substrate 56 is attached to the doorframe 41 by means of a clip or the like. The door wiring harness 43 having connectors 52-55 on each end relative to the connectors 48,49 on the doorframe 41 and also to connectors 50,51 on the trim cover 42 is arranged on the harness substrate 56.

A switch unit 46 with a power-window switch, a trunk-opener switch, and the, like is provided on an armrest portion of the trim cover 42, and the connectors 50,51 of the switch unit 46 are provided on the back of the trim cover 42.

After connecting the connectors 48,49,52,53 of the doorframe 41 and of the harness substrate 56 by attaching the harness substrate 56 to the doorframe 41, the trim cover 42 is installed on the doorframe 41 while connecting the connectors 50,51,54,55 of the trim cover 42 and of the harness substrate 56.

In the above prior art structure, however all the connectors are to be simultaneously connected while positioning the trim cover 42 against the doorframe 41, the connecting work is not easy and needs much time. And, in case that a moving mechanism is provided on the connectors of the electric accessories on both the doorframe 41 and the trim cover 42 for the purpose of easier connection, the connectors of the accessories would become too large to be installed in a narrow space in the door, which becomes more significant with an increase of electric accessories.

SUMMARY OF THE INVENTION

An object of the present invention is to provide a door wiring harness connecting structure wherein a trim cover can be easily installed to a doorframe with better workability on connecting connectors of the doorframe and of the trim cover; connection of connectors can be surely performed without a moving mechanism on the connectors; and many of connectors can be connected within a small space.

In order to achieve the above object, the present invention adopts a structure wherein a receiving member is provided on a doorframe and a hooking member relative to the receiving member is provided on a trim cover, a terminal-accommodating portion which accommodates a terminal portion of a wiring harness on the doorframe is formed on the receiving member, a contacting spring-portion of the terminal portion projects over the terminal-accommodating portion into a receiving groove, and an end connecting-portion of another wiring harness on the trim cover is fixed to an inside of the hooking member to enable the end connecting-portion to be connected to the contacting spring-portion.

The receiving member and the holdings member may be horizontally installed, respectively, on said doorframe and on said trim cover. The terminal portion may have a pair of projections projecting from opposite sides, and the terminal-accommodating portion may have a terminal-inserting groove relative to the projections and an exposing opening relative to the contacting spring-portion. The harnesses each on the doorframe and on the trim cover may be of a flexible flat wiring harness.

According to the present invention, the trim cover can be provisionally installed easily to the doorframe by hanging the holdings member of the trim cover on the receiving member of the doorframe, while the end connecting portion of the harness on the trim cover is positioned and put into contact elastically with the terminal portion of the harness on the doorframe, thereby performing smooth and sure connection of the harnesses. Thus, connector connecting-work can be performed efficiently. And, simplification of a pair of connectors by accommodating the terminal portion in the receiving member and by fixing the flat end connecting-portion to the hooking member eliminates their imperfect attachment as occurs in a conventional connector and achieves space-saving in a door. Further, this simplified structure enables installation of many electric accessories in a door or to permit a thinner door. On the contrary, easier detachment of the trim cover from the doorframe simplifies disassembly of a door, which would promote recycling of door parts.

The above and other objects and features of the present invention will be more apparent from the following description taken in conjunction with the accompanying drawings.

DETAILED DESCRIPTION OF THE PREFERRED EMBODIMENTS

FIG. 1 through FIG. 6 show an embodiment of a door wiring harness connecting structure according to the present invention.

Figure 1:
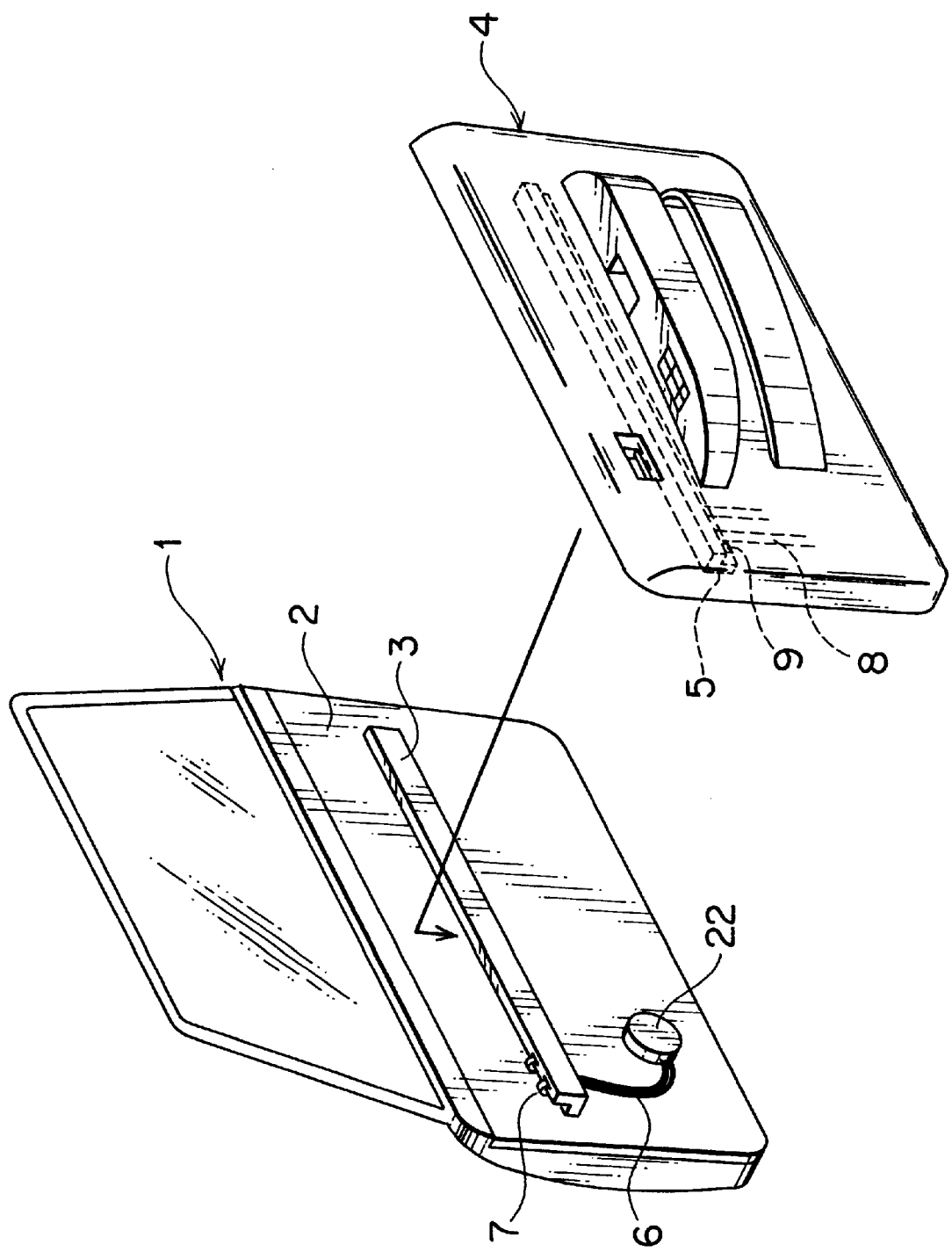
FIG. 1 is an exploded perspective view showing an embodiment of a door wiring harness connecting structure in accordance with the present invention.
Figure 2:
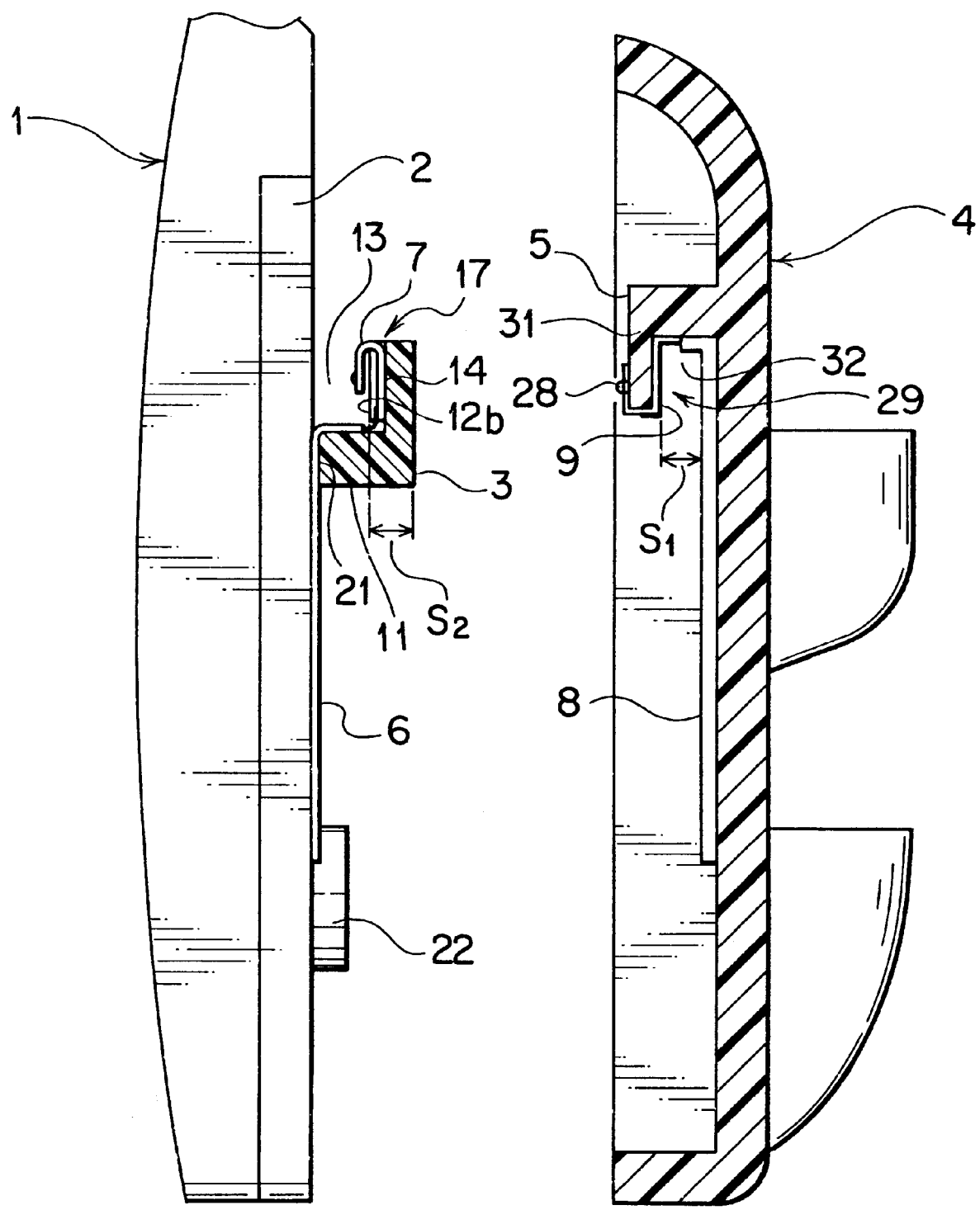
FIG. 2 is a side view of the embodiment of FIG. 1.
Figure 3:
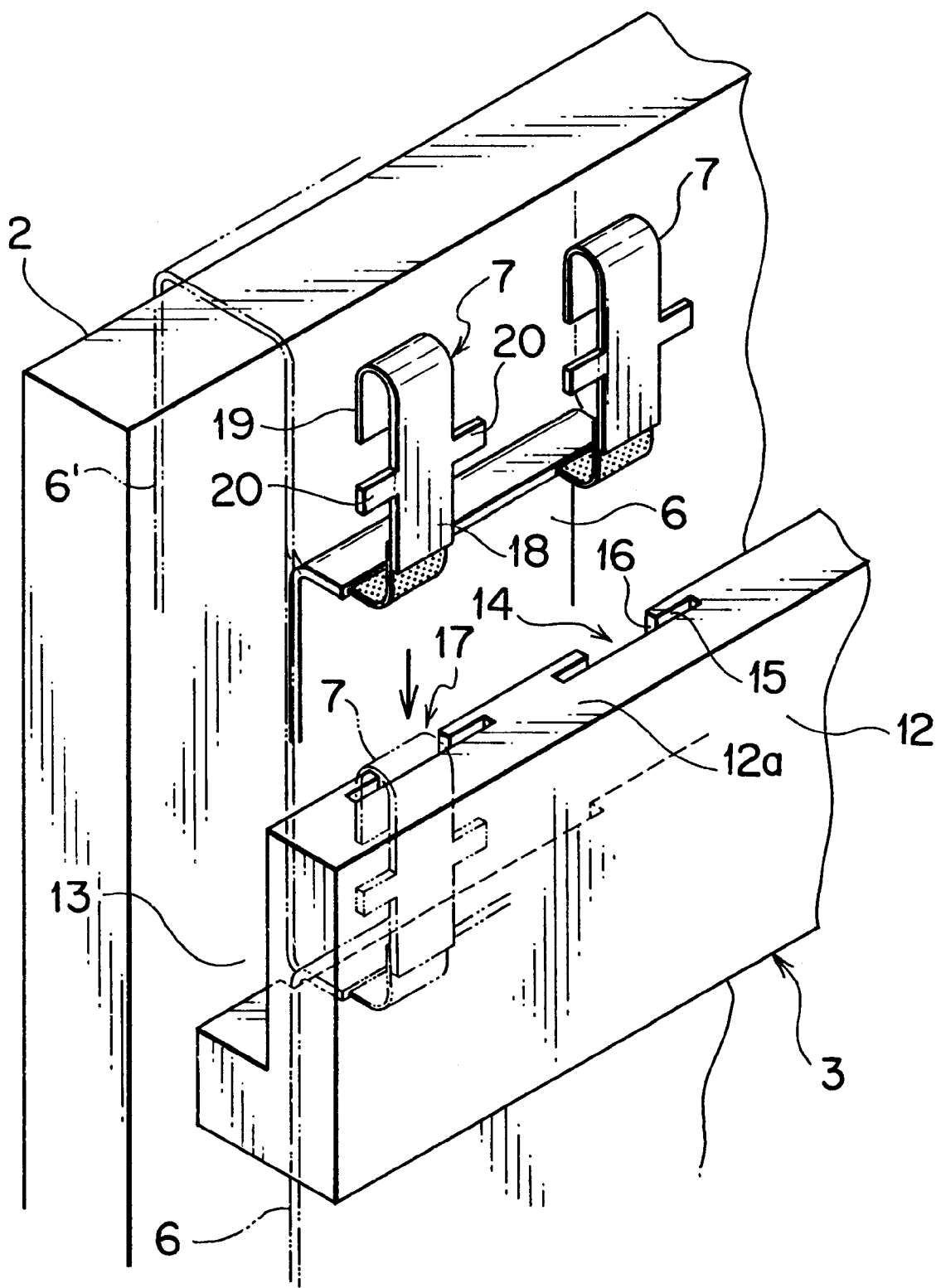
FIG. 3 is an exploded perspective view showing a state of attaching a terminal portion of a wiring harness to a doorframe.

In this structure, as shown in FIG. 1 a receiving member 3 with a L-shaped section projects from a panel 2 of a doorframe 1 and a hooking member 5 relative to the receiving member 3 projects over the back of a trim cover 4 and, as shown in FIGS. 2 and 3, a terminal portion 7 of a flexible flat wiring harness 6 on the doorframe 1 is arranged on the receiving member 3 and an end connecting-portion 9 of a flexible flat wiring harness 8 on the trim cover 4 is arranged on the holdings member 5, wherein the hooking member 5 can be hung on the receiving member 3 while connecting the terminal portion 7 to the connecting-portion 9.

As shown in FIG. 1, the receiving member 3 is molded integrally with the panel 2 made of insulating resin and has a substantially L-shaped vertical section, with a receiving groove 13 inside, constructed with a horizontal wall 11 (FIG. 2) projecting over the panel 2 and with a vertical wall 12 standing on the horizontal wall 11 and extends horizontally along the doorframe 1.

As shown in FIG. 3, a pair of T-shaped slit-like terminal-accommodating portions 14 are formed on the vertical wall 12 The terminal-accommodating portion 14 consists of a wide terminal-inserting groove 15 dug down vertically from an upper end 12a of the vertical wall 12 and a narrow spring-exposing opening 16 notched between the terminal-inserting groove 15 and an inner surface 12b (FIG. 2) of the vertical wall 12. A simple connector 17 is constructed by accommodating the terminal portion 7 of the flexible flat wiring harness 6 in the terminal-accommodating portion 14.

The terminal portion 7 is provided with a contacting spring-portion 19 bent in a substantially reversed U-shape at the end of a substrate portion 18 and with a pair of projections 20,20 projecting from the sides of the substrate portion 18. The above terminal-inserting groove 15 is formed a little wider than a width between the ends of the projections 20,20 so as to receive and hold the projections 20,20 in itself, and the spring-exposing opening 16 is formed a little wider than the contacting spring-portion 19 so as to project the contacting spring-portion 19 into the receiving groove 13.

The flexible flat wiring harness 6 is led, for example, through a through-hole 21 on the horizontal wall 11 of the receiving member 3 and connected to an electric accessory 22, like a power-window motor, on the panel 2 as shown in FIG. 1, or the harness 6 is bent in a substantially U-shape along the receiving groove 13 and led along the back of the panel 2 via its top, as shown with a broken line 6' in FIG. 3 and connected to the electric accessory 22. In FIG. 1, the panel 2 is attached to the doorframe 1.

The flexible flat wiring harness 6 may be widely formed along the longitudinal direction of the receiving member 3, whereby many door wiring harness circuits relative to many electric accessories can be provided by forming many terminal-accommodating portions 14 in a longitudinal direction of the receiving member 3.

Figure 4:
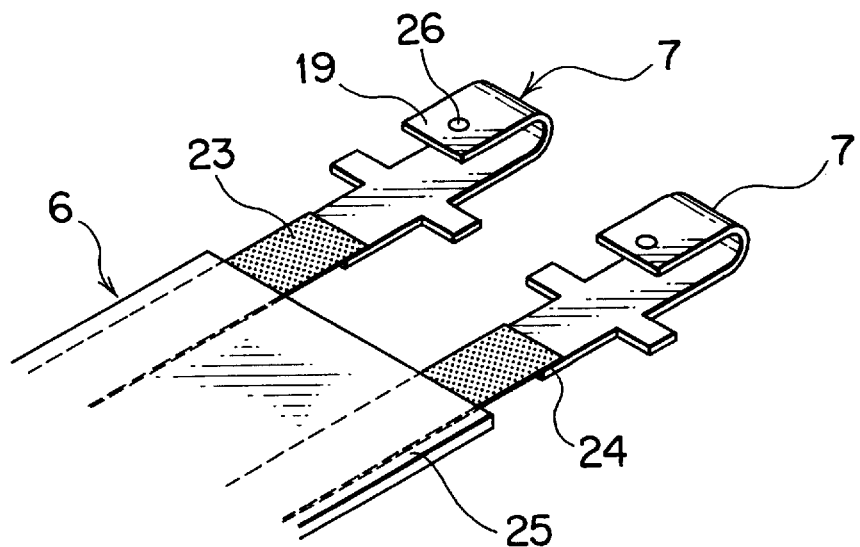
FIG. 4 is a perspective view of the terminal portion of the harness on the doorframe of FIG. 3.

As shown in FIG. 4, a pair of terminal portions 7,7 are fixed to each end of conductor portions 23 of the flat harness 6 by means of deposition or the like. The conductor portion 23 is covered with a sheet 25 made of insulating resin. The contacting spring-portion 19 is provided with a contacting projection 26 relative to the flat harness 8 on the trim cover 4.

Figure 5:
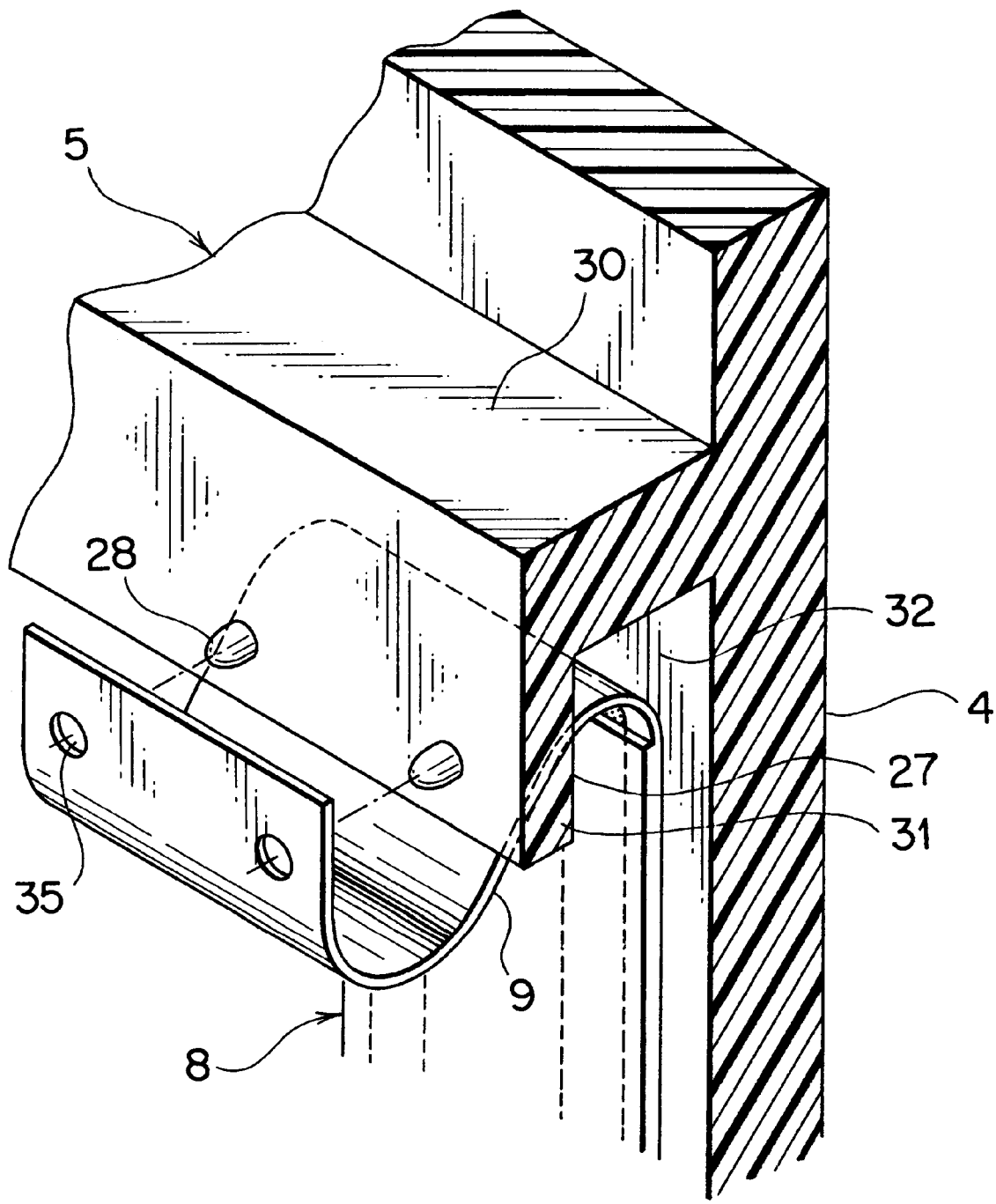
FIG. 5 is an exploded perspective view showing a state of attaching an end connecting portion of another wiring harness to a trim cover.
Figure 7:
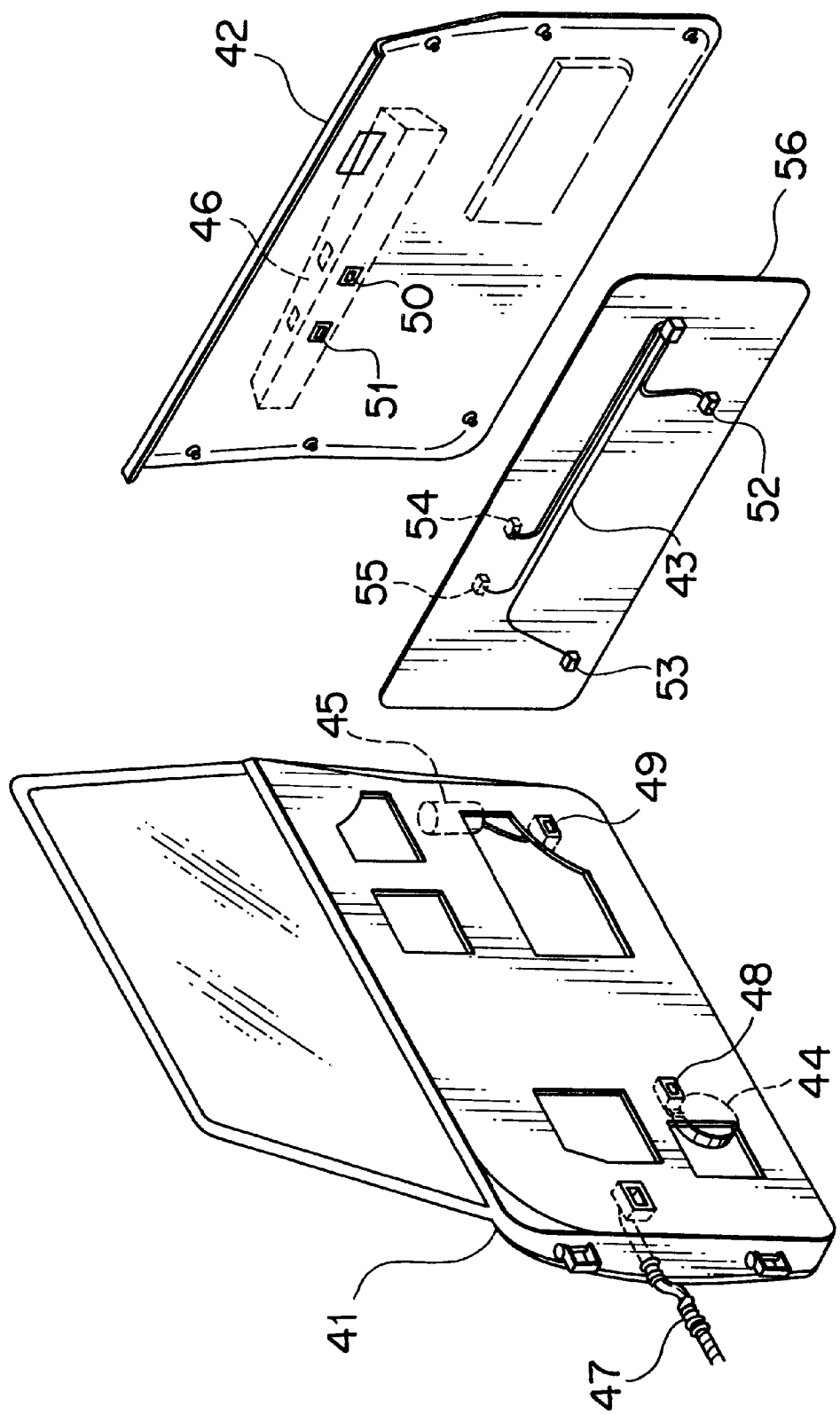
FIG. 7 is a perspective view showing a prior art door wiring harness connecting structure.

As shown in FIGS. 2 and 5, the end connecting-portion 9 of the flat harness 8 on the trim cover 4 is arranged in winding along an inner surface 27 of the hooking member 5 and fixed with a pair of locking pins 28 at an outside of the hooking member 5, thereby constructing a simple connector 29.

The hooking member 5 consists of a horizontal wall 30 projecting from the trim cover 4 and of a vertical wall 31 directed downward from the horizontal wall 30 and forms inside a hanging groove 32 and extends horizontally along the trim cover 4. Width $S_1$ of the hanging groove 32 is set almost equally to, or somewhat larger than, width $S_2$ of the vertical wall 12 of the above receiving member 3 for getting elastic contact of the contacting spring-portion 19 of the terminal portion 7 with the end connecting-portion 9 in the hanging groove 32. The receiving groove 13 is engaged with the vertical wall 31 of the hooking member 5.

Figure 6:
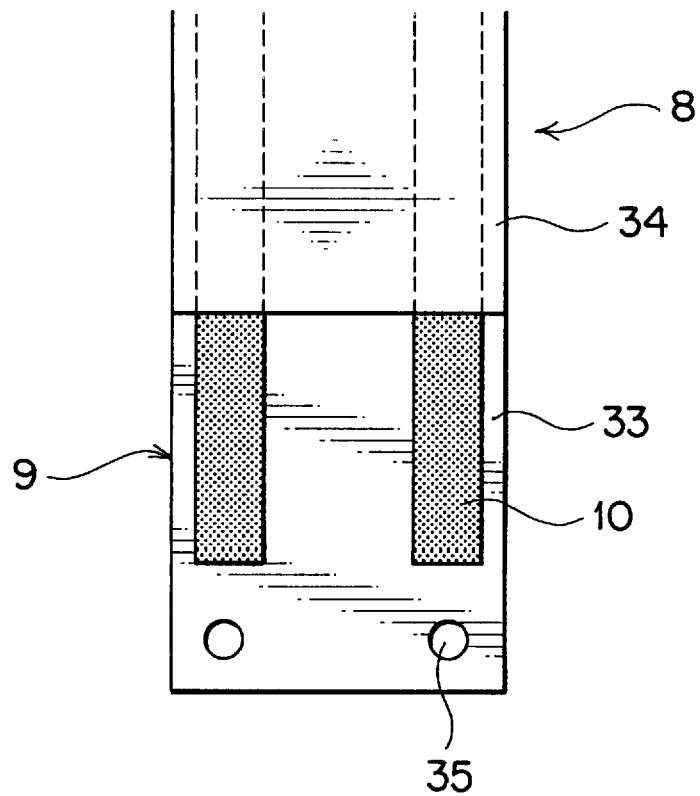
FIG. 6 is a plan view of the end connecting-portion of the harness on the trim cover of FIG. 5.

As shown in FIG. 6, the flat harness 8 on the trim cover 4 is arranged between sheets 33,34 made of insulating resin and has exposed conductors 10 exposing their ends on the sheet 33. A pair of locking holes 35 relative to the locking pins 28 are formed at an end portion of the sheet 33.

The end connecting-portion 9 is fixed to the hooking member 5 by insertion of the locking pins 28 into the locking holes 35. The locking pins 28 may be deposited on the sheet 33 by ultrasonic, or the like. The exposed conductors 10 of the end connecting-portion 9 are, as shown in FIG. 5, disposed along the inner surface 27 of the vertical wall 31 of the hooking member 5.

The trim cover 4 can be provisionally installed easily to the doorframe 1 by hanging the hooking member 5 on the receiving member 3, while the end connecting-portion 9 of the flat harness 8 on the trim cover 4 is positioned and put into contact elastically with the terminal portion 7 of the flat harness 6 on the doorframe 1, and thus both the flat harnesses 6,8 are surely connected each other. Consequently, the electric accessory 22 on the doorframe 1 is electrically connected to a switch (not shown) on the trim cover 4 through the flat harnesses 6,8.

What is claimed is:

1. A wiring harness connecting structure comprising:

a doorframe of a door;

a receiving member provided on said doorframe and cooperating with said doorframe to form a receiving groove;

a terminal-accommodating portion formed in said receiving member for accommodating an electric terminal portion of a wiring harness arranged on said doorframe;

said electric terminal portion containing a contacting spring portion projecting from said terminal-accommodating portion of said receiving member and extending into said receiving groove;

a trim cover for mounting on said doorframe;

a hooking member provided on said trim cover and being cooperable with said receiving member for mounting said trim cover on said doorframe; and another wiring harness on said trim cover having an end electrically-connecting portion fixed to an inside part of said hooking member and being operative to connect with said contacting spring portion when said hooking member is mounted on said receiving member for installing said trim cover to said doorframe.

2. The wiring harness connecting structure as claimed in claim 1, wherein said receiving member and said hooking member are horizontally installed on said doorframe and on said trim cover, respectively.

3. The wiring harness connecting structure as claimed in claim 2, wherein said terminal portion has a pair of projections on both sides thereof, and said terminal-accommodating portion has a terminal-inserting groove relative to said projections and an exposing opening to expose said contacting spring-portion therefrom.

4. The wiring harness connecting structure as claimed in claim 3, wherein said hooking member has a locking portion relative to a locked portion of the harness on the trim cover.

5. The wiring harness connecting structure as claimed in claim 2, wherein said hooking member has a locking portion relative to a locked portion of the harness on the trim cover.

6. The wiring harness connecting structure as claimed in claim 1, wherein said terminal portion has a pair of projections on both sides thereof, and said terminal-accommodating portion has a terminal-inserting groove relative to said projections and an exposing opening to expose said contacting spring-portion therefrom.

7. The wiring harness connecting structure as claimed in claim 5, wherein said hooking member has a locking portion relative to a locked portion of the harness on the trim cover.

8. The wiring harness connecting structure as claimed in claim 1, wherein said hooking member has a locking portion relative to a locked portion of the harness on the trim cover.

9. The wiring harness connecting structure as claimed in any one of claims 1 to 4, wherein said harnesses on the doorframe and on the trim cover are each a flexible flat wiring harness.

* * * * *